(12) United States Patent
Tsai et al.

(10) Patent No.: US 10,207,131 B2
(45) Date of Patent: Feb. 19, 2019

(54) ANCHORAGE CONNECTOR FOR A SAFETY SYSTEM

(71) Applicant: 1078955 BC LTD., Surrey (CA)

(72) Inventors: Jack Yi Yo Tsai, Surrey (CA); Bryan Willis Robinson, Surrey (CA)

(73) Assignee: 1078955 BC LTD., Surrey (CA)

( * ) Notice: Subject to any disclaimer, the term of this patent is extended or adjusted under 35 U.S.C. 154(b) by 0 days.

(21) Appl. No.: 14/916,832

(22) PCT Filed: Sep. 5, 2014

(86) PCT No.: PCT/CA2014/000682
§ 371 (c)(1),
(2) Date: Mar. 4, 2016

(87) PCT Pub. No.: WO2015/031983
PCT Pub. Date: Mar. 12, 2015

(65) Prior Publication Data
US 2016/0199678 A1    Jul. 14, 2016

Related U.S. Application Data

(60) Provisional application No. 61/874,355, filed on Sep. 6, 2013.

(51) Int. Cl.
*A62B 35/00* (2006.01)
*A62B 35/04* (2006.01)
(Continued)

(52) U.S. Cl.
CPC .......... *A62B 35/04* (2013.01); *A62B 35/0068* (2013.01); *C08G 18/10* (2013.01);
(Continued)

(58) Field of Classification Search
CPC ... A62B 35/04; A62B 35/0068; E04G 21/328; E04G 21/329; E04G 3/20; A47G 29/02; E06B 7/28
(Continued)

(56) References Cited

U.S. PATENT DOCUMENTS 1,818,797 A * 8/1931 Feyens ................ F16K 41/10
417/472
3,762,507 A * 10/1973 Starr ..................... A62B 35/04
182/4

(Continued)

FOREIGN PATENT DOCUMENTS

JP          3163017 B2    5/2001
WO     WO 99/51304 A2   10/1999

OTHER PUBLICATIONS

International Search Report for International Patent Application No. PCT/CA2014/000682 dated Dec. 22, 2014, 3 pages.

(Continued)

*Primary Examiner* — Nkeisha Smith
(74) *Attorney, Agent, or Firm* — Nexus Law Group LLP; Nicholas P. Toth

(57) ABSTRACT

An anchorage connector for use in a height safety system is provided. The anchorage connector comprises an energy absorbing, deformable, corrugated enclosed chamber having a first end and a second end, and at least one anchorage attachment point, at one end or both ends.

4 Claims, 8 Drawing Sheets

(51) Int. Cl.
*C08G 18/48* (2006.01)
*C08G 18/66* (2006.01)
*C08G 18/10* (2006.01)
*C08G 18/22* (2006.01)
*C08K 7/28* (2006.01)

(52) U.S. Cl.
CPC ....... *C08G 18/222* (2013.01); *C08G 18/4841* (2013.01); *C08G 18/4866* (2013.01); *C08G 18/6674* (2013.01); *C08K 7/28* (2013.01)

(58) Field of Classification Search
USPC ..... 248/636, 237, 688; 182/4; 267/294, 141, 267/149, 152, 162
See application file for complete search history.

(56) References Cited

U.S. PATENT DOCUMENTS

| | | | | |
|---|---|---|---|---|
| 3,997,151 A * | 12/1976 | Leingang | ................ | F16F 1/406 267/140 |
| 4,203,304 A * | 5/1980 | Decker | ..................... | F16D 3/72 464/99 |
| 4,968,010 A * | 11/1990 | Odobasic | ............... | B60G 11/48 267/140.11 |
| 5,014,474 A * | 5/1991 | Fyfe | ........................ | E04H 9/022 14/73.5 |
| 5,065,988 A * | 11/1991 | Wedell | ...................... | F16F 1/00 267/149 |
| 5,676,356 A * | 10/1997 | Ekonen | .................. | B60G 5/053 248/634 |
| 7,201,367 B2 * | 4/2007 | Wietharn | ............... | B60G 11/22 267/141 |
| 7,963,378 B2 * | 6/2011 | Glance | ................ | B60R 13/0225 188/377 |
| 8,317,173 B2 * | 11/2012 | Kawada | .................... | F16F 1/40 248/575 |
| 8,511,628 B2 * | 8/2013 | Cox | ......................... | A62B 1/04 248/237 |
| 8,864,115 B2 * | 10/2014 | Kawada | .................... | F16F 1/40 267/141 |
| 9,421,402 B2 * | 8/2016 | Blaise | ................ | A62B 35/0043 |
| 9,431,809 B2 * | 8/2016 | Vogel | ................. | A62B 35/0068 |
| 9,528,535 B2 * | 12/2016 | Massengill | ............... | F16B 1/00 |
| 9,649,517 B2 * | 5/2017 | Csizmadia | ......... | A62B 35/0068 |
| 2004/0140169 A1 * | 7/2004 | Shimoda | ................ | B60R 21/04 188/377 |
| 2010/0007069 A1 * | 1/2010 | Kawada | .................. | F16F 1/406 267/140.3 |
| 2010/0243837 A1 * | 9/2010 | Cox | ......................... | A62B 1/04 248/237 |
| 2017/0247894 A1 * | 8/2017 | Sargent | ............. | A62B 35/0068 |

OTHER PUBLICATIONS

Piping Technology & Products, "Replacing a Spring Coil With Stainless Steel Bellows," Oct. 21, 21997, located at: http://www.pipingtech.com/blog/1997/10/21/replacing-a-spring-coil-with-stainless-steel-bellows/, last accessed on Mar. 4, 2016, 7 pages.

* cited by examiner

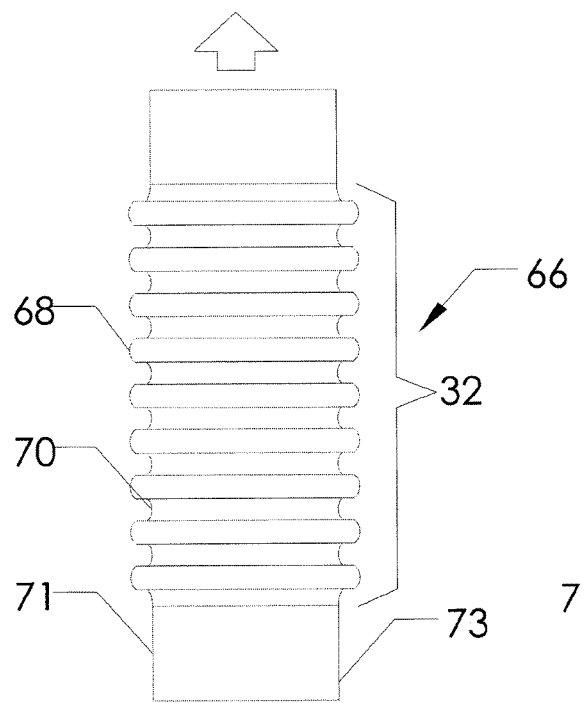
Figure 17
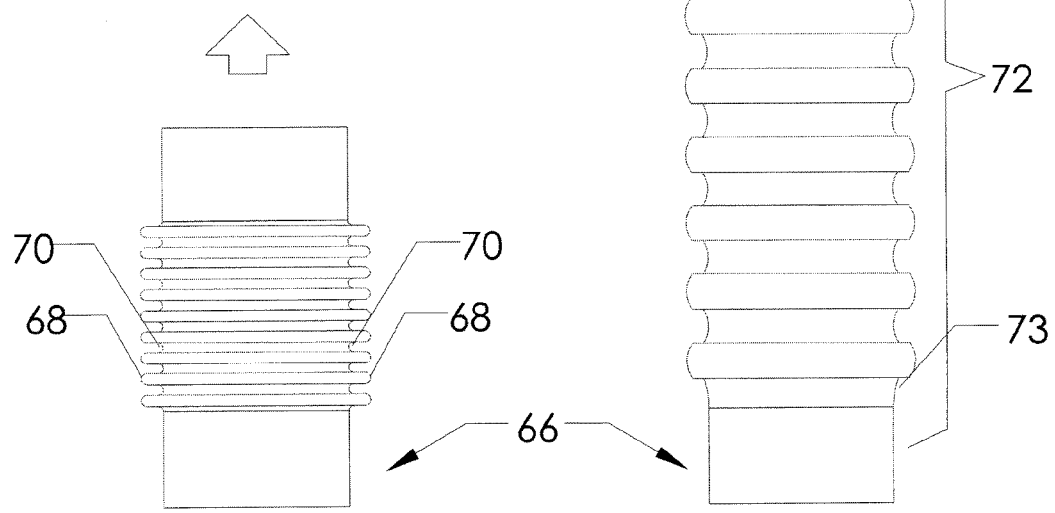
Figure 16
Figure 18

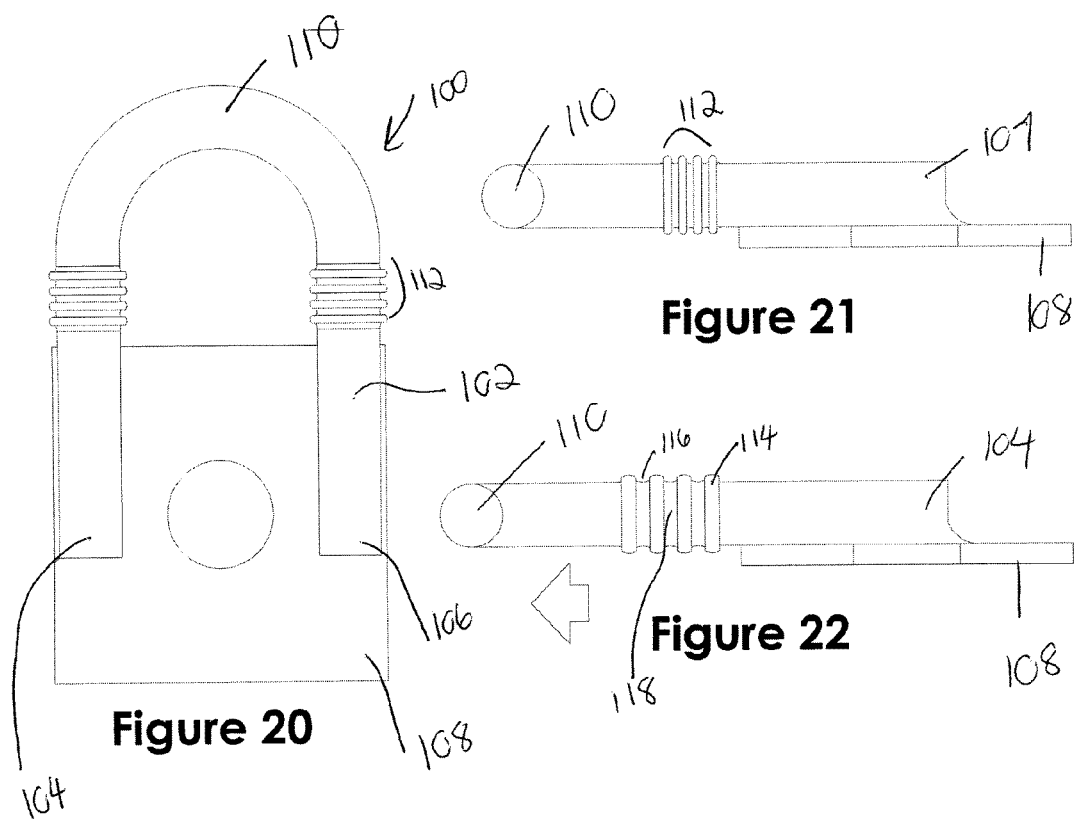
Figure 20 · Figure 21 · Figure 22
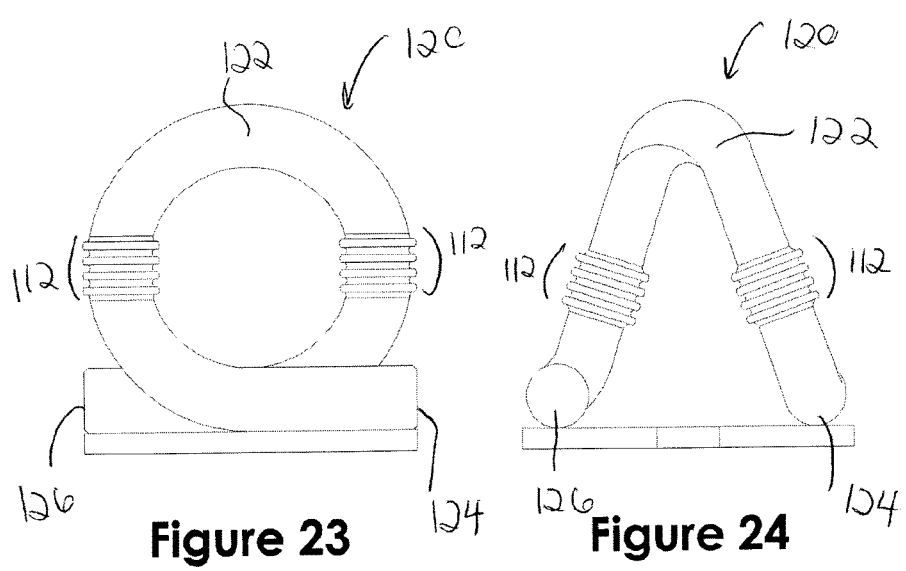
Figure 23 · Figure 24

ANCHORAGE CONNECTOR FOR A SAFETY SYSTEM

CROSS-REFERENCE TO RELATED APPLICATIONS

This application is a U.S. National Phase of International Application No. PCT/CA2014/000682, filed Sep. 5, 2014, which claims priority to U.S. Provisional Application No. 61/874,355, filed Sep. 6, 2013, the references of which are hereby incorporated by reference in their entireties.

FIELD OF THE INVENTION

This invention relates generally to the field of height fall and safety equipment and, in particular, to an anchorage connector system suitable for anchoring a flexible, elongate safety lifeline or horizontal lifeline.

BACKGROUND OF THE INVENTION

In many jobs, it is necessary for a worker to do his/her job at an elevation or height. Similarly equipment, materials and products may be moved and transferred at height. As may be appreciated, there are some issues in working at any elevated position, including the possibility of an inadvertent fall and injury to the worker, inadvertent dropping of equipment, materials and products and resulting damage to workers, structures, buildings and the like, as a consequence. Therefore, precautions are often taken (for example at work sites, construction sites and/or buildings) to reduce or minimize the potential of accidents. These accidents can include a worker slipping or falling from his/her elevated work site, and equipment, materials and products falling from height.

Fall arrest is the form of fall protection which involves the safe stopping before impact of a person or load already falling. Generally, this is not only used but legally required at various work-sites. Some regulations require that an elevated worker be secured by a line to catch and suspend them should he/she fall from the surface on which he/she is working. The line must be fixed to a secure anchorage connector point or tie-off point should primary support of the worker fail or release, so that it will arrest the fall, hold and support the weight of the (falling) worker. The other end of the line is usually secured to the worker, such as with a harness. In such cases the line is referred to as lifeline. To provide such protection, and to also maintain mobility for the worker, retractable reels are often used, and allow the worker to pull out or feed out a safety lifeline or tether to allow them to access the workspace around their tie-off point.

To further prevent injury in the case of a fall, regulations associated with the tie-off point for a worker require that the tie-off point be (where possible) located above the elevated work surface on which the worker is located. In the case of buildings, usually, as the building is constructed, the worker, and work surface are not yet located at the top of the building or at the roof level, the tie-off point may be located at a sufficient distance above the work surface. In such a case, the structures of the building provide suitable tie-off points above the work surface.

There are two major types of fall arrest (not including contact/impact with lower surface or hazard): 1) general fall arrest, such as nets; and 2) personal fall arrest, such as lifelines. The most common manifestation of fall arrest in the workplace is the Personal Fall Arrest System, or PFAS (normally includes a "lifeline"). To arrest a fall in a controlled manner, it is desirable that there is sufficient energy absorption capacity in the system. Without this designed energy absorption, the fall can only be arrested by applying large forces to the worker and to the anchorage connector, which can result in either or both being severely affected.

So, as currently known, an anti-fall system comprises four elements referred to as "ABCD"s of fall arrest:
- A—Anchorage—a fixed structure or structural adaptation, often including an anchorage connector, to which the other components of the PFAS are rigged.
- B—Body Wear—a full body harness worn by the worker.
- C—Connector—(also referred to interchangeably as a "safety lifeline") a subsystem component connecting the harness to the anchorage connector—such as a lanyard.
- D—Deceleration Device—a subsystem component designed to dissipate the forces associated with a fall arrest event.

In addition, "Anchorage Connector" ("AC") refers in industry to a device between the anchorage and the connector.

Each of these elements has been considered critical to the effectiveness of a personal fall arrest system. In a most common fall arrest system, the vertical lifeline is a stranded rope that is connected to an anchorage connector above, and to which the user's personal protection equipment ("PPE"), such as harness is attached either directly or through a "shock absorbing" (energy absorbing) lanyard. This is often then called a "safety lifeline.

There is much room for improvement in the PPE area, particularly relating to the absorbance of energy on a fall. It is an object of the present invention to obviate or mitigate the above disadvantages.

SUMMARY OF THE INVENTION

The present invention provides, in one aspect, an anchorage connector for use in a height safety system, said anchorage connector comprising an energy absorbing, flexible, corrugated enclosed chamber having a first end and a second end, and at least one anchorage attachment point, at one end or both ends.

The present invention provides, in one aspect, an anchorage connector for use in a height safety system, said anchorage connector comprising an energy absorbing, flexible, corrugated enclosed chamber having a first end and a second end, at least one anchorage attachment point, and at least one load attachment point.

The present invention provides, in one aspect, an anchorage connector for use in a height safety system, said anchorage connector comprising an energy absorbing, flexible, corrugated enclosed chamber having a first end and a second end and at least one anchorage attachment point on one or both of the first end and the second end, and a load attachment point, for attachment of a load, via a safety lifeline.

The present invention provides, in one aspect, an anchorage connector for use in a height safety system, said anchorage connector comprising an energy absorbing, flexible, corrugated enclosed chamber having a first end and a second end, an anchorage attachment point at the first end and a load attachment point at the second end, for attachment of a load, via a safety lifeline.

The present invention provides, in one aspect, an anchorage connector for use in a height safety system wherein a load is engaged with an anchorage via a horizontal lifeline ("HLL"), said anchorage connector comprising an energy absorbing, flexible, corrugated enclosed chamber having a first end and a second end, an anchorage attachment point on both the first end and the second end, wherein the anchorage is the HLL and wherein safety lifeline, for load is removably connectable to HLL.

The present invention further provides a height safety system comprising an anchorage connector comprising an energy absorbing, flexible, corrugated enclosed chamber having a first end and a second end and at least one attachment point, on at least one of the first end and the second end, for attachment to a safety line (the "safety lifeline attachment end"); the safety lifeline arranged for removable attachment to a load; and a base for attaching the chamber, via at least one of the first end and the second end, and with an anchorage.

The present invention provides, in one aspect, an energy absorbing arrest device for use on a HLL between at least two fixed points wherein a load is harnessed to safety lifeline which is removably attachable to the HLL, said device comprising an energy absorbing, flexible, corrugated enclosed chamber having a first end and a second end to which may be attached the HLL.

The device as provided herein offers significant advantages over previously known and used devices. The energy absorbing device is for use in connection with loads (for example, users, material, equipment, products, etc. . . . ), at height. The device is not simply for protecting a falling load, although that is certainly one intended benefit. In addition, the device serves to protect the "anchorage" itself (for example, whether that be a building, structure, etc. . . . ) by dispersing the energy of the load fall, over a longer time. The flexible, corrugated enclosed chamber, upon receiving the stress of the load, under fall, deforms and therein disperses the fall energy.

It is also important that the forces endured by the anchorage be majorly reduced so that failure of the anchorage is less likely to occur. To this end, the device of the present invention will tilt, lean, collapse over reducing the major moment forces involved with normal fixed anchorage connectors. This will now permit placement of the device of the present invention onto weaker structures including, for example, standing seam, wood, and lighter construction roofs, where attachment of the prior art fixed rigid style AC could not be easily accommodated or would have involved major reinforcing to permit use of fixed ACs. The AC device of the present invention increases safety for workers as these lighter structures may now be capable of performing in a way that was previously impossible.

There is an enormous overall benefit in being able to secure fall arrest loads, wherein load to an anchorage (structure) would have been unable to be safely accommodated by conventional fixed, rigid anchorage connectors. Furthermore, there is significant benefit to attachment of loads, via HLLs using the device of the present invention.

These and other advantages will be full appreciated by the preferred description and figures provided below.

BRIEF DESCRIPTION OF THE DRAWINGS

FIG. 16 is another side view of an anchorage connector and system in a non-stressed state;
FIG. 17 is another side view of an anchorage connector and system in a moderate-stressed state;
FIG. 18 is another side view of an anchorage connector and system in an extreme-stressed state;
FIG. 20 is a top view of a variant of an anchorage connector;
FIG. 21 is a side view of the anchorage connector of FIG. 20 in a non-stressed state;
FIG. 22 is a side view of the anchoring anchorage connector device of FIG. 20 in a moderately stressed state;
FIG. 23 is an end view of a variant anchorage connector;
and
FIG. 24 is a side view of a variant of an anchorage connector.

Figure 1:
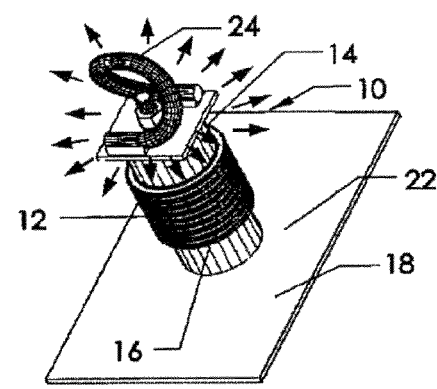
FIG. 1 is a perspective view of an anchorage connector and system.
Figure 2:
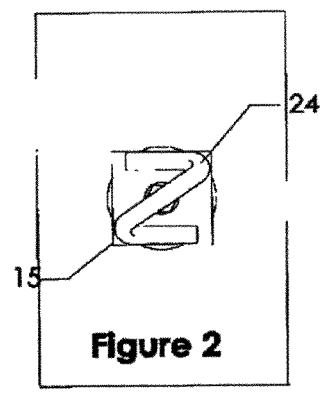
FIG. 2 is a top plan view of an anchorage connector and system.
Figure 3:
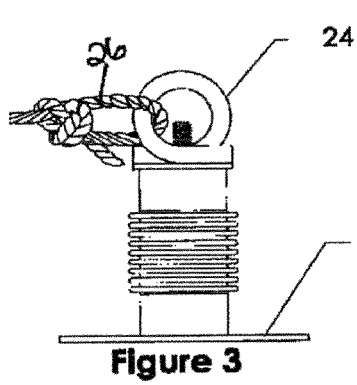
FIG. 3 is a side view of an anchorage connector and system.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Terms

The term "product" means any machine, manufacture and/or composition of matter, unless expressly specified otherwise.

The term "device" means the anchorage connector in accordance with the present invention.

The term "method" means any process, method or the like, of using the device of the invention, unless expressly specified otherwise.

Each process (whether called a method or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" or "variant" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

The term "anchorage" means a structure or structural adaptation to which the other components of a PFAS are rigged. The anchorage connector device of the invention is directly or indirectly attached to an anchorage.

The term "body wear" is intended to have broad meaning and comprises any means securing or holding a load. For example, when the load is a human, body wear means a body harness (full or partial body harness, as appropriate). For example, when the load is materials such as a beam, the body wear comprises straps and harnesses around the beam.

The term "connector" is also referred to interchangeably as a "safety lifeline" and is a subsystem component connecting the harness or body wear to the anchorage connector. Examples of a connector are lanyards or ropes.

The term "deceleration device" refers to a component designed to dissipate forces associated with a fall arrest event.

The term "anchorage connector" or AC is a device between generally the anchorage and the connector.

The term "load" refers to any object, user (for example, workers) materials, tools, equipment and products. It is intended to have broad scope and meaning.

It is to be understood that the term "lifeline" as used herein does not refer to the following three basic types of lifeline systems or parts thereof
1) vertical—VLL
2) horizontal—HLL
3) retractable—SRD or previously SRL (Self retractable Device/Lifeline The term "lifeline" (also called "safety line" or "safety lifeline") as used herein refers to the load's means of attachment from its/his/her harness to an anchorage or anchorage connector.

In general, there are three basic types of anchorage connector systems for fall protection:
1) designed for fixed support—load-rated anchorage connectors specifically rigidly designed and permanently installed for fall prevention and protection purposes and for fall arrest as an integral part OR added permanent part of a building or structure (for example, roof anchorage connectors or roof tieback anchorage connectors on high-rise buildings);
2) temporary fixed support—anchorage connector systems designed to be connected to the structure using specific installation instructions (for example, nail-on anchorage connectors used by roofers/shinglers). Temporary means anchorage connector is attached strictly for the immediate purpose and then being removed after the immediate purpose has been completed; and
3) existing structural features or equipment not intended as anchorage connector points but verified by a professional engineer or competent person as having adequate capacity to serve as an anchorage connector point (for example, roof top mechanical rooms, structural steel member, or reinforced concrete columns).

Within the scope of the present invention, significant innovations and improvements have been made to anchorage connectors, allowing such devices to be collapsible, tip over, tilt over, deform, and become substantially yieldable under pressure of a load fall, therein absorbing fall energy and protecting both the anchorage (structure) and the load itself.

More preferably, the present invention comprises energy absorbing arrest device for use with various workplace configurations, whether vertical or horizontal. Specifically, the present invention comprises an energy absorbing device for use in a line system (for example a HLL) between at least two fixed points wherein a user is harnessed to the HLL via the PFAS and wherein the device comprises an energy absorbing, flexible, corrugated tubular chamber having a first end and a second end and wherein each end is attached to said HLL in series.

In many embodiments, one end of the anchorage connector is fixed/fastened to a structure and the other end is available for attachment to the load's safety lifeline, when the present invention is configured as a single point anchorage connector. In the alternative, both ends of the anchorage connector may be fixed/fastened to a horizontal lifeline system (HLL) to which a PFAS lifeline system may be attached (by, for example, a carabineer, traveler, etc. . . . ).

All anchorage connectors within the scope of the invention comprise an energy absorbing, flexible, corrugated enclosed chamber, as described further herein. In one aspect, the entirety of the chamber may be corrugated. In another aspect, only a portion of the chamber may be corrugated. In one aspect, the corrugations are symmetrical. In another aspect, the corrugations are asymmetrical. For greater clarity, the embodiments depicted in FIGS. 20-24 illustrate an anchorage connector in which both the first end and the second end are connectable to an anchorage and wherein the first end and the second end define a closed loop through which a safety lifeline is threadable and joinable for removable attachment of a load. On either "side" of the loop, the corrugations may be either symmetrical or asymmetrical. Positioning on "ends" may be either symmetrical or asymmetrical.

The term "chamber" as used herein is intended to be an elongate enclosed area of any shape but most preferably an enclosed chamber, for example, of a tubular configuration. Other shapes of chamber may be used so long as they are i) energy absorbing, ii) flexible and iii) corrugated. A key to the energy absorbing arrest device of the present invention is that the chamber is not a spring or an open chamber but rather a closed "bellows".

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. .sctn.1.72(b). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

II Overview

The invention comprises a device that aids in load (for example worker) safety by providing an anchorage connector, for attachment to a structure which by its design, securely arrests a load fall around a full 360° range of motion. This is achieved by the use of a flexible, deformable corrugated chamber (although not necessarily, most preferably with circular corrugations) which remains in a generally contracted state until a fall, wherein the "corrugations" expand to a point of expansion wherein the load comes to rest and falling ceases. Maximum expansion of the corrugations does not necessarily or even ordinarily occur. Often partial expansion will absorb sufficient energy—the fall arrest energy of the fallen load having been fully satisfied by only that partial degree of expansion.

A simple analogy to best describe the operation of the device of the invention, with its flexible corrugated chamber, is a corrugated drinking straw. In normal operation, the straw corrugations are in a tight connection, with ridges and troughs in contracted or engaged spacing. Once the straw is "pulled" from both ends, the alternating ridges and troughs separate from each other to a point of maximum expansion, wherein the straw can be expanded no further. The flexible corrugated chamber of the invention, of which the anti-fall anchorage connector and anchorage connector system is comprised, operates on the same basic principle (regardless of whether chamber is circular in circumference, or not). The flexible corrugated chamber comprises a series of ridges and troughs, which in normal operation, are in immediate or contracted connection. Upon a fall by a worker, who is harnessed via a safety lifeline directly or indirectly to the flexible corrugated chamber, such ridges and troughs, initially contracted, become expanded and separated from an immediate connection of adjacent trough to ridge to an expanded connection of trough to ridge to a maximum expansion of X, which represents the greatest or maximum extensibility of the corrugations.

Simply put, the expansion of the corrugations absorbs energy of the fall of the load. The degree to which energy is absorbed, thereby providing i) a safer fall for the load and ii) during and after fall, maintenance of the integrity of the structure, as noted above, is a factor of, among other things, the material from which the flexible corrugated chamber is made, the number of corrugations, the orientation of the corrugations and distance between ridges/troughs, the diameter of the chamber, the length of the chamber and the width/diameter of the chamber. Similarly, due to the (up to) 360° range of motion afforded by the flexible, tubular corrugated chamber of the invention, a load can fall from any direction or angle and same energy absorbing fall protection is provided i.e. energy absorbance and fall protection is multi-directional.

While it is anticipated that many usages of the anti-fall anchorage connector of the invention will occur at height on buildings and in construction, there are many other uses and as such, the device is not limited to one use. These other uses include building inspection and maintenance of any tall structure such as, for example, wind turbines, electricity poles, transmission lines and towers pylons and radio/communications masts, boat masts/funnels, within transportation and shipping industries (for example, loading and unloading of shipping containers), within retail operations such as big box stores (loading and unloading merchandise from high shelves), within and about refinery and factory facilities, within and about dams and electrical generational facilities, within and about mining sites. The potential for use is broad and these claims are not intended to be limited to any one use.

Figure 19:
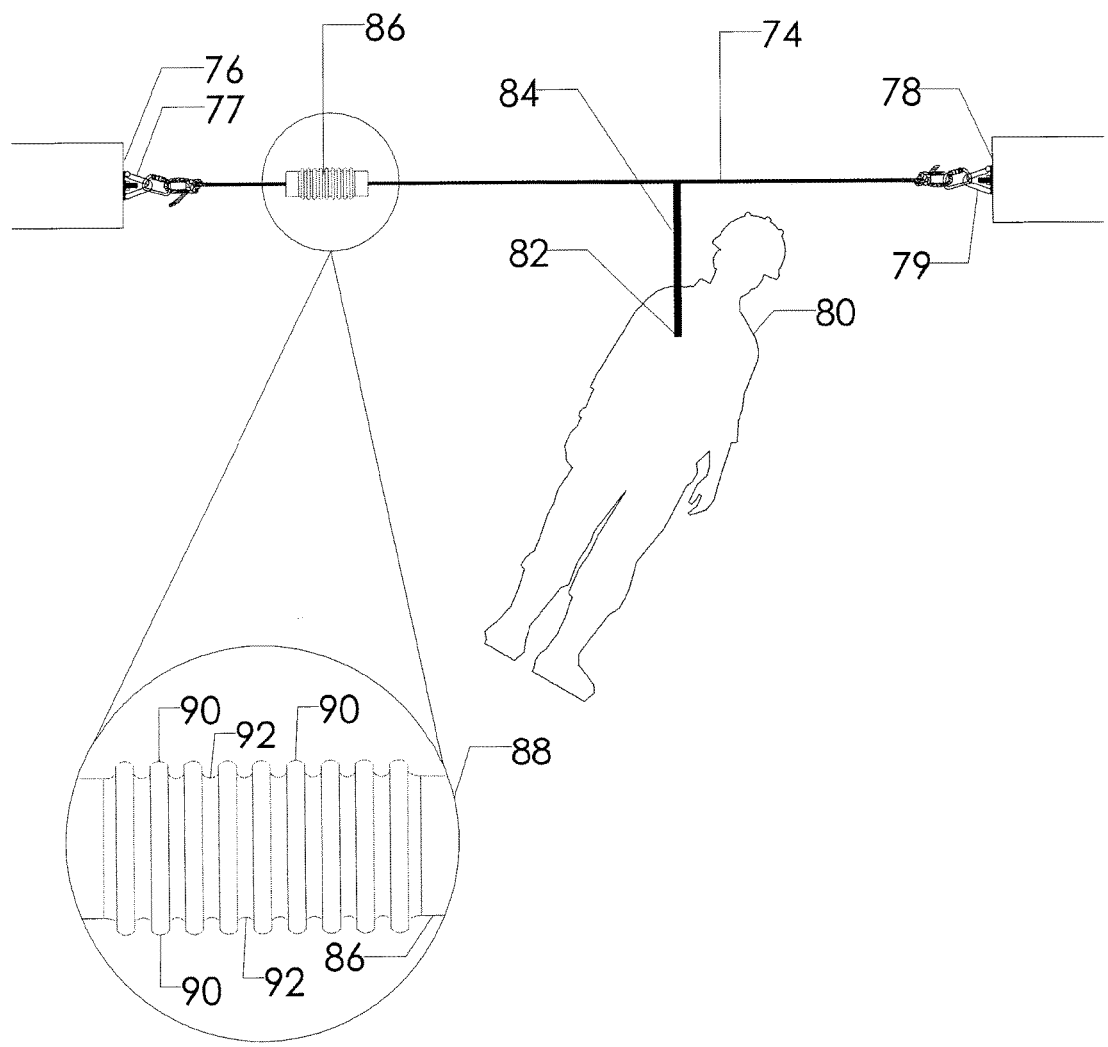
FIG. 19 is a side view of an anchorage connector horizontally engaged on a horizontal lifeline (HLL) between two fixed points and depicting worker (a load) hanging, via body wear (a harness) from safety lifeline attached to HLL.

There are several related embodiments of the invention, broadly defined as an anchorage connector comprising energy absorbing, flexible, corrugated enclosed chamber having a first end and a second end; and at least one anchorage attachment point. Optionally, the anchorage connector may comprise a direct load attachment point. If anchorage connector does not comprise a "direct" load attachment point, it is otherwise secondarily connectable to a load via an indirect means (for example, via an HLL, shown in FIG. 19). In FIG. 19, the HLL is the anchorage and each end of the anchorage connector is removably connected to the HLL. The load 80 is attached to the HLL 84, as shown.

In one further aspect, as shown in FIGS. 1-8 and 12-15, the anchorage connector comprises an energy absorbing, flexible, corrugated enclosed chamber having a first end and a second end and at least one anchorage attachment point on the first end and there is provided, at the second end, a load attachment point, for attachment of a load, via a safety lifeline.

In a further aspect, as shown in FIGS. 9-11 and 19 an anchorage connector for use in a height safety system wherein a load may be engaged with an anchorage via a safety lifeline, said anchorage connector comprising an energy absorbing, flexible, corrugated enclosed chamber having a first end and a second end, an anchorage attachment point on both the first end and the second end, wherein the anchorage is a HLL. FIG. 19 actually depicts the HLL as 74. The load is indirectly attached to the HLL via the safety lifeline 84

In a further aspect, as shown in FIGS. 20-24, there is provided an anchorage connector comprising an energy absorbing, flexible, corrugated enclosed chamber having a first end and a second end wherein both the first end and the second end are connectable to an anchorage (either directly or optionally via a base plate, to which the first end and second end may be more permanently attached, if desired) and wherein the first end and the second end define a closed loop through which a safety lifeline is threadable and joinable for removable attachment of a load.

In a further preferred form, the corrugated tubular chamber may have an additionally flexible non-corrugated tube liner therein to enhance the anchorage connector's tensile strength.

Turning now to the drawings, wherein like numbers denote like parts throughout the several views, FIGS. 1-6 are illustrative views of a fall protection device, or apparatus, 10 consistent with an embodiment of the invention. In one embodiment, shown in FIGS. 1-4 and 4a, a fall protection device ("device") 10 generally comprises an energy absorbing, flexible, corrugated tubular chamber 12 with a first end 14 and a second end 16. Tubular chamber 12 is engaged at chamber base 22 (at second end 16) with surface of an anchorage or structure (not shown) via base plate 18. In other words, base plate 18 serves to securably connect tubular chamber 12 to a surface of the anchorage or structure. At first end 14, there is provided a hitching means 24 engaged with chamber 14 by plate 15. The hitching means is used to attach a safety lifeline 26 (FIG. 3) which is engaged or removable by a worker.

Figure 5:
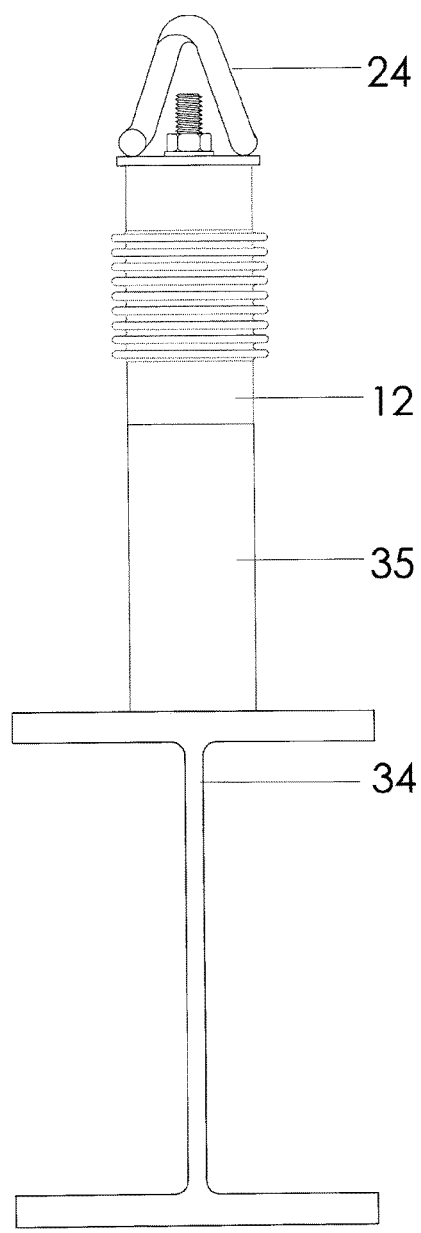
FIG. 5 is another end view of an anchorage connector and system.
Figure 6:
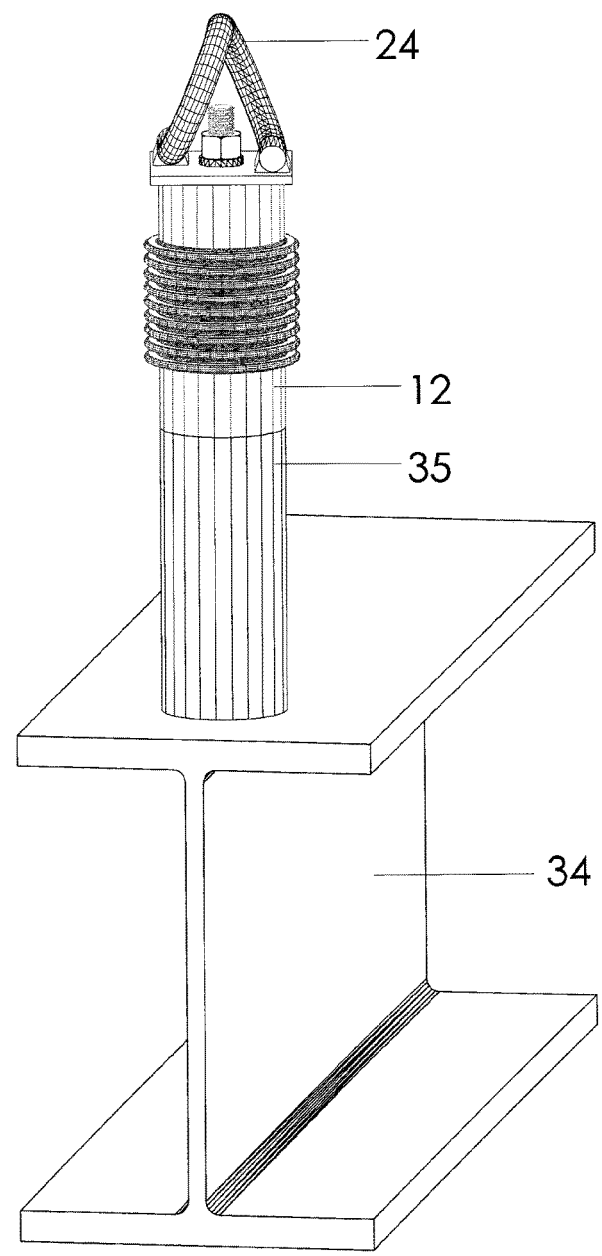
FIG. 6 is another perspective view of an anchorage connector and system.

In FIGS. 1 to 4, 4a and 18, there is shown a baseplate to which the anchorage connector is fastened to. The baseplate along with the anchorage connector may be used as a complete or ready assembled unit. The whole entire assembly then is fastened onto the structure (anchorage). Conversely, there may be instances where a baseplate will not be required and anchorage connector engages directly with the anchorage (see FIGS. 7, 7a and 8). FIGS. 5 and 6 show attachment of the anchorage connector directly to a steel girder.

Tubular chamber 12 is circular (in this embodiment) and comprises a plurality of troughs 28 and ridges 30 in ringed corrugations. In contracted form, as shown in FIGS. 1-4, troughs 28 are tightly and engagingly compacted. In an expanded form, as shown in FIGS. 13, 14, 15 17, and 18 illustrating the behaviour of the energy absorbing tube in the event of a fall of the load, the size of troughs expand yielding a larger space 32 therein i.e. as pressure is brought to bear on tubular chamber 12.

Figure 4:
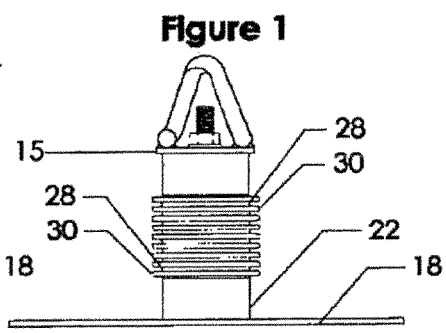
FIG. 4 is an end view of an anchorage connector and system.
Figure 4A:
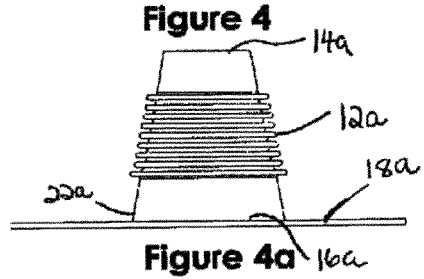
FIG. 4a is an end view of an alternative anchorage connector.

FIG. 4a specifically depicts an embodiment in which an energy absorbing, flexible, corrugated tubular chamber 12a with a first end 14a and a second end 16a. Tubular chamber 12a is engaged at chamber base 22a (at second end 16a) with surface of an anchorage or structure (not shown) via base plate 18a. The channel 12a is shown to taper from second end 16a to first end 14a. In other words, there is no requirement within the scope of the invention that the diameter of the tubular chamber be entirely uniform along its length.

Figure 7:
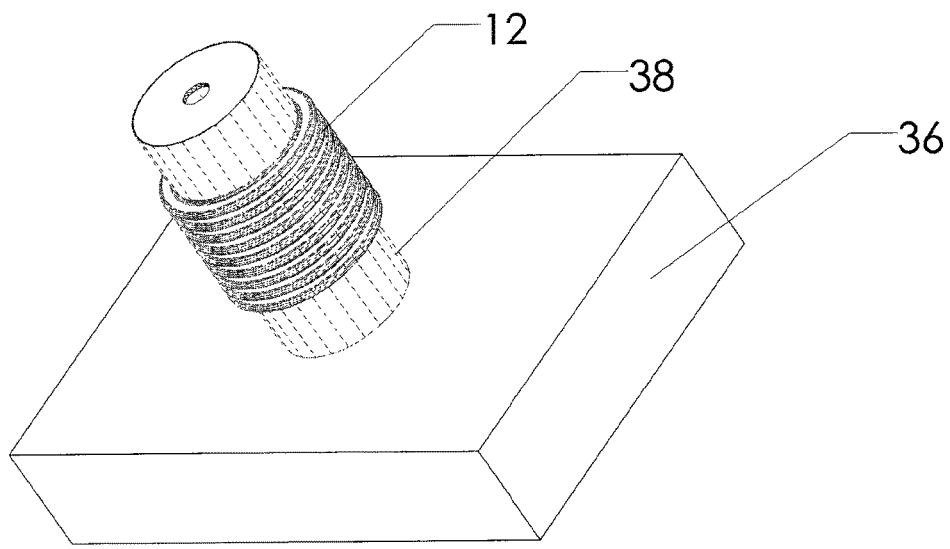
FIG. 7 is another perspective view of an anchorage connector and system.
Figure 7A:
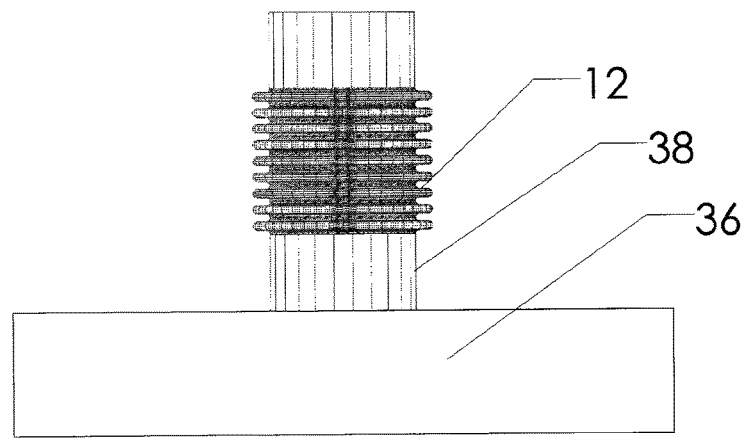
FIG. 7a is an end view of an alternative anchorage connector.
Figure 8:
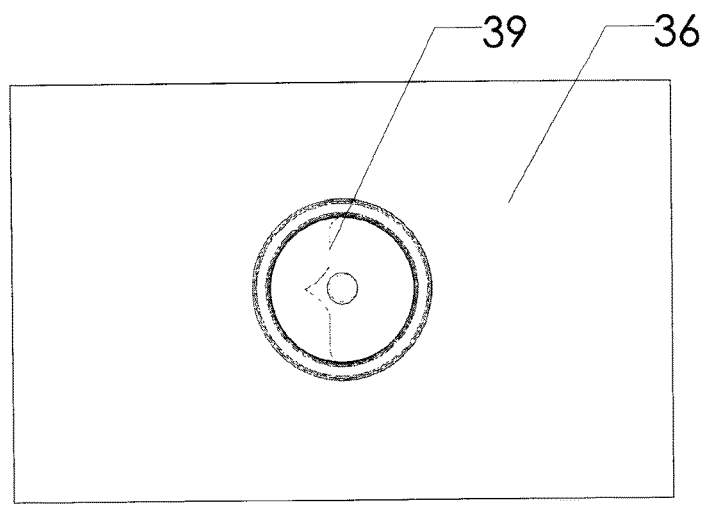
FIG. 8 is another top plan view of an anchorage connector device and system.

FIGS. 5 and 6 show an alternative embodiment wherein tubular chamber 12 is attached to steel girder 34 via base 35. FIGS. 7, 7a and 8 show tubular chamber 12 attached to block 36 via base 38. It is to be understood throughout all embodiments that the "base" is preferably integral with and forms a non-corrugated part of the tubular chamber. In other words, it is a preferred aspect that each anchorage connector comprises a tubular chamber with both corrugated and non-corrugated moieties. FIG. 8 is a top plan view through which diameter 39 of tubular chamber 12 can be seen.

Figure 9:
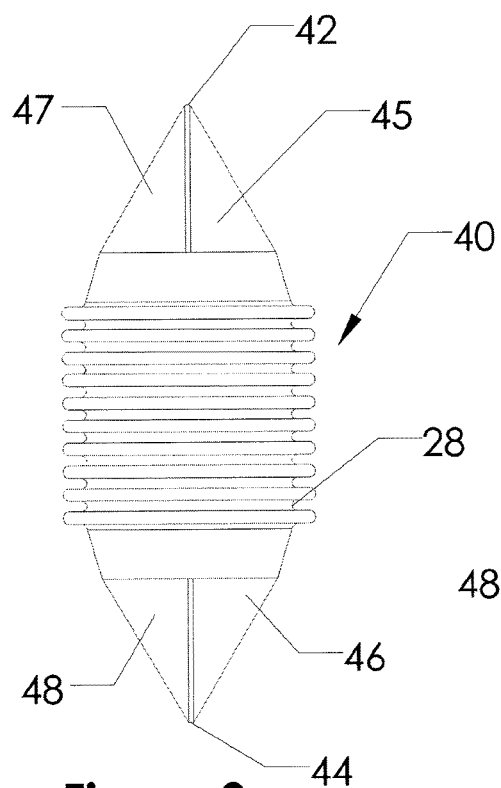
FIG. 9 is another side view of an anchorage connector device and system.
Figure 10:
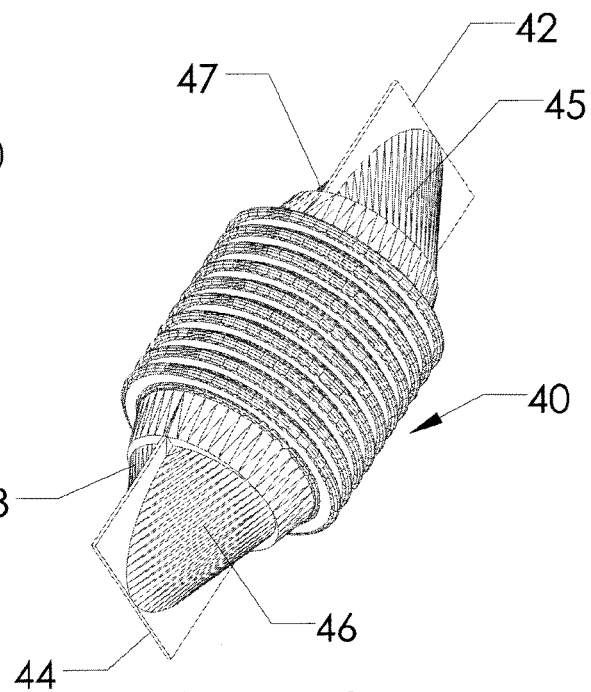
FIG. 10 is another perspective view of an anchorage connector device and system.
Figure 11:
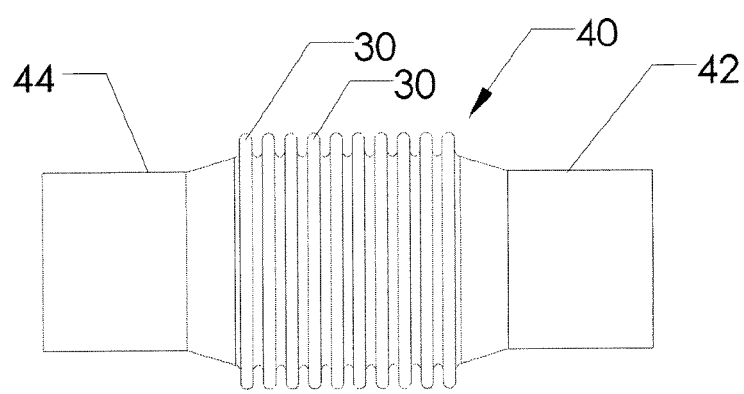
FIG. 11 is another top plan view of an anchorage connector and system.
Figure 12:
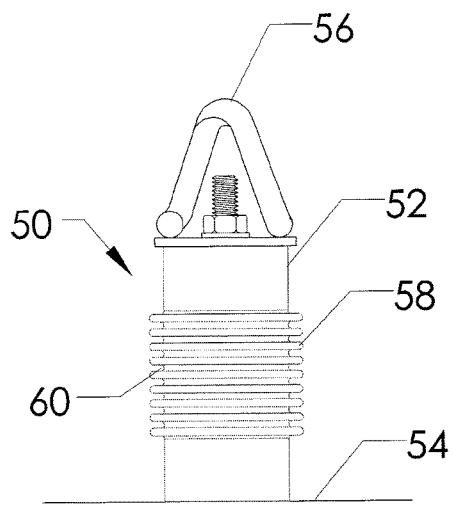
FIG. 12 is another end view of an anchorage connector and system in a non-stressed state.
Figure 13:
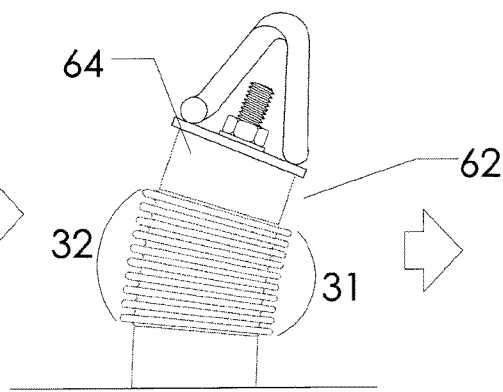
FIG. 13 is another end view of an anchorage connector and system in a moderate-stressed state.
Figure 14:
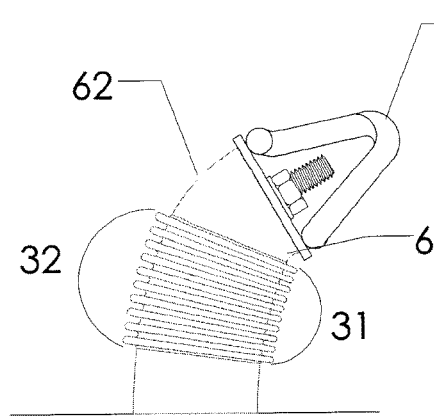
FIG. 14 is another end view of an anchorage connector and system in a high-stressed state.

FIGS. 9-11 show further an alternative embodiment of tubular chamber shown generally at 40 comprising a first end 42 and an identical second end 44. Each end defines an upper lip 45 (first end) and 46 (second end) and a lower lip 47 (first end) and 48 (second end). It is preferred that this embodiment of anchorage connector may be employed on a HLL, wherein both ends are removably attachable to HLL.

Figure 15:
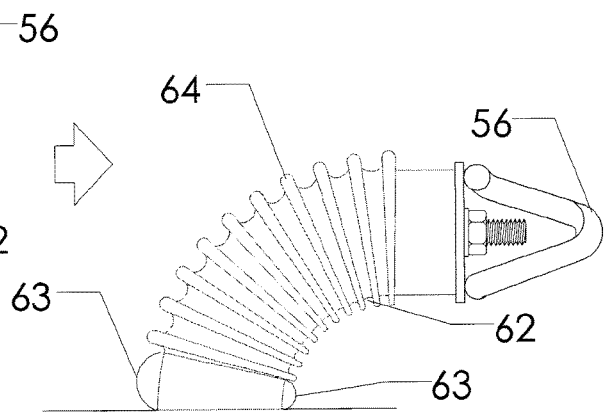
FIG. 15 is another end view of an anchorage connector and system in an extreme or maximum-stressed state.

FIGS. 12 to 15 graphically illustrate the behaviour of the device in absorbing energy during a fall. The energy can be absorbed in any direction up to 360 degrees laterally. Device generally shown at 50 comprises a tubular hollow chamber 52 engaged with a surface 54 and comprising a hitching means 56. Tubular hollow chamber 52 comprises, an accordion or bellows-like plurality of alternating ridges 58 and troughs 60 In FIGS. 13 and 14, device 50 is subjected to lateral pressure and as a consequence of this, ridges and grooves on right side 62 of tubular chamber 12 contract and are pressed together creating compressed space 31. Concurrently, ridges and grooves on left side 64 of tubular chamber 12 expand and are pulled part creating greater space 32 within. The results of final or maximum pressure assault are depicted in FIG. 15. One can see that right side 62 and left side 64 are both are pulled part creating greater space within. The invention an enclosed corrugation of any size, shape, and material to absorb energy, by extending, elongating, deforming, sketching, those corrugations. 63 may be solid or flexible.

FIGS. 16-18 graphically illustrate the behaviour of the device in absorbing energy axially. These illustrations are a companion to FIG. 19. Hollow tubular chamber generally indicated at 66 is shown sequentially from FIGS. 16 to 18 with increasing axial pressure thereon. In FIG. 16, ridges 68 and troughs 70 are relatively compacted. As pressure is applied, ridges and troughs expand and are pulled part creating greater space 32 within. The results of final or maximum pressure assault are depicted in FIG. 18. One can see that top and bottom, 71 and 73 are both are pulled part creating maximum space 72 between greater space within and between ridges and troughs FIG. 19 shows a HLL 74 strung horizontally between first fixed point 76 (at anchorage point 77) and second fixed point 78 (at anchorage point 79). A user 80 wears a harness 82 engaged with safety life line 84. Line 84 is engaged with HLL 74 such that when the user falls, HLL 74 is intended to "break fall" to prevent the user falling to the ground. Energy absorbing anchorage connector in accordance with the invention is shown at 86. Bubble 88 is an exploded portion of anchorage connector 86 and illustrates the ridges 90 and troughs 92. Upon fall by user 80, axial behaviour of anchorage connector 86 is as depicted in FIGS. 16-18.

As shown in FIGS. 20-24, there is provided an anchorage connector 100 comprising an energy absorbing, flexible, corrugated enclosed chamber 102 having a first end 104 and a second end 106 wherein both the first end and the second end are connectable to an anchorage, not shown (either directly or optionally via a base plate 108, to which the first end 104 and second end 106 may be more permanently attached, if desired) and wherein between the first end 104 and the second end 106 of chamber 102 is formed a defined a closed loop 110 through which a safety lifeline (not shown) is threadable and joinable for removable attachment of a load (not shown).

FIG. 21 is a side view of anchorage connector 100 in a stressed state, wherein load has applied a degree of energy to the device, causing chamber to list or bend to the left—however with no resulting deformations of corrugations, 112. FIG. 22 is a side view of anchoring anchorage connector device of FIG. 20 in a moderately stressed state; as pressure is applied, alternating ridges 114 and troughs 116 expand and are pulled part creating greater space 118 within FIG. 23 is an end view of a variant anchorage connector 120 wherein closed loop 122 is formed between first end 124 and the second end 126 of chamber 128, wherein first end 124 and second end 126 are offset (not aligned). FIG. 24 is a side view of the variant of FIG. 23.

So, the present invention provides an anchorage connector for use in a height safety system, said anchorage connector comprising an energy absorbing, flexible, corrugated enclosed chamber having a first end and a second end, and an anchorage attachment point, at one end or at both ends Preferably, in the anchorage connector, a load is removably attachable to the first end, via a connector. Preferably, the second end is removably attachable to an anchorage via the anchorage attachment point. Preferably, the second end is removably attachable to an anchorage via a base plate. Preferably, the corrugated, enclosed chamber additionally includes a flexible yet reinforcing liner therein. Preferably, the connector is a safety lifeline. Preferably, the anchorage is selected from the group consisting a structure or structural adaptation. Preferably, the anchorage is selected from the group consisting of a building, and horizontal lifeline (HLL). Preferably, the load is selected from the group consisting of objects, animals (including humans), materials, tools, equipment and products. Preferably, the corrugated, enclosed chamber comprises a plurality of corrugations (each comprising a ridge and a trough) and wherein anchorage connector, when under an excess of pressure from a connector, is extendible in length from a contracted state to a plurality of expanded states and wherein amount of pressure from safety lifeline required to expand the chamber to an expanded state depends on at least one of:
a) material from which the flexible chamber is made;
b) number of corrugations;
c) orientation of the corrugations and distance between ridges/troughs; and
d) diameter of the chamber, the length of the chamber and the thickness of a wall of the chamber.

The present invention provides an anchorage connector for use in a height safety system, said anchorage connector comprising an energy absorbing, flexible, corrugated enclosed chamber having a first end and a second end, at least one anchorage attachment point, and at least one load attachment point. Preferably, the anchorage connector comprising an energy absorbing, flexible, corrugated enclosed chamber having a first end and a second end and at least one anchorage attachment point on one or both of the first end and the second end. Preferably, the anchorage connector comprises an energy absorbing, flexible, corrugated enclosed chamber having a first end and a second end and at least one anchorage attachment point on one of the first end and the second end, and a load attachment point, for attachment of a load via a safety lifeline. Preferably, the anchorage connector comprises an energy absorbing, flexible, corrugated enclosed chamber having a first end and a second end, an anchorage attachment point at the first end and a load attachment point at the second end, for attachment of a load, via a safety lifeline. Preferably, a load is engaged with an anchorage via a safety lifeline, said anchorage connector comprising an energy absorbing, flexible, corrugated enclosed chamber having a first end and a second end, an anchorage attachment point on both the first end and the second end, wherein the anchorage is a horizontal lifeline ("HLL").

The present invention further comprises a height safety system comprising an anchorage connector comprising an energy absorbing, flexible, corrugated enclosed chamber having a first end and a second end and at least one attachment point, on at least one of the first end and the second end, for attachment to a safety line, the safety lifeline arranged for removable attachment to a load; and a base for attaching the chamber, via at least one of the first end and the second end, and with a structure.

The present invention further comprises an energy absorbing arrest device for use in series on a horizontal lifeline (HLL) between at least two fixed points wherein a load is harnessed to safety lifeline which is removably attachable to the HLL, said device comprising an energy absorbing, flexible, corrugated enclosed chamber.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various devices and methods described above may omit some parts or acts, include other parts or acts, and/or execute acts in a different order than set out in the illustrated embodiments.

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

The invention claimed is:

1. An anchorage connector for use in a height safety system to protect a load against a force of a fall and to protect an anchorage, said anchorage connector comprising an energy absorbing, deformable, collapsible, at least partially corrugated enclosed bellows-forming chamber having a first end and a second end, and an anchorage attachment point, at one end or at both ends, and wherein the at least partially corrugated, enclosed bellows-forming chamber comprises a plurality of corrugations, each comprising a ridge and a trough, and wherein the anchorage connector, when under an excess of pressure from a fall, is extendible in length, leanable and tittable, affords a 360° range of motion, and wherein the at least partially corrugated enclosed bellows-forming chamber is deformable from a contracted state to a plurality of expanded states thereby dispersing fall energy from the load and wherein an amount of pressure from a safety lifeline required to expand the chamber to an expanded state depends on at least one of:
a) material from which the deformable chamber is made;
b) a number of corrugations;
c) an orientation of the corrugations and distance between ridges/troughs of the corrugations;
d) length of the chamber; and
e) width/diameter of the chamber,
wherein the at least partially corrugated, enclosed bellows forming chamber additionally includes a deformable yet reinforcing liner therein.

2. An anchorage connector for use in a height safety system, to protect a load against a force of a fall and to protect an anchorage, said anchorage connector comprising an energy absorbing, deformable, collapsible, at least partially corrugated enclosed bellows-forming chamber having a first end and a second end and wherein, for attachment of a load via a safety lifeline, i) an anchorage attachment point is on one or both of the first end and the second end and ii) a load attachment point is on one or both of the first end and the second end, and wherein the at least partially corrugated, enclosed bellows-forming chamber comprises a plurality of corrugations, each comprising a ridge and a trough, and wherein the anchorage connector, when under an excess of pressure from a fall, is extendible in length, leanable and tiltable, affords a 360° range of motion, and wherein the at least partially corrugated enclosed bellows-forming chamber is deformable from a contracted state to a plurality of expanded states thereby dispersing fall energy from the load, wherein the load is engaged with the anchorage via the safety lifeline, wherein the anchorage attachment point is on both the first end and the second end, and wherein the anchorage is a horizontal lifeline ("HLL").

3. A height safety system to protect a load against a force of a fall and to protect an anchorage, comprising an anchorage connector, said anchorage connector comprising an energy absorbing, deformable, collapsible, at least partially corrugated enclosed bellows forming chamber having a first end and a second end and at least one attachment point, on at least one of the first end and the second end, for attachment to a safety line, the safety lifeline arranged for removable attachment to the load; and a base for attaching the chamber, via at least one of the first end and the second end, and with a structure and wherein the corrugated, enclosed chamber comprises a plurality of corrugations, each comprising a ridge and a trough, and wherein the anchorage connector, when under an excess of pressure from a fall, is extendible in length, leanable and tiltable, affords a 360° range of motion, and wherein the at least partially corrugated enclosed bellows forming chamber is deformable from a contracted state to a plurality of expanded states thereby dispersing fall energy, and wherein an amount of pressure from the safety lifeline required to expand the chamber to an expanded state depends on at least one of:
   a) material from which the deformable chamber is made;
   b) a number of corrugations;
   c) an orientation of the corrugations and a distance between ridges/troughs of the corrugations;
   d) length of the chamber, and
   e) width/diameter of the chamber.

4. An energy absorbing arrest device in series on a horizontal lifeline (HLL) between at least two fixed points wherein a load is harnessed to a safety lifeline which is removably attachable to the HLL, said device usable to protect a load against a force of a fall and to protect an anchorage, said device comprising an energy absorbing, deformable, collapsible, at least partially corrugated enclosed bellows forming chamber and wherein the at least partially corrugated, enclosed bellows forming chamber comprises a plurality of corrugations, each comprising a ridge and a trough, and wherein the device, when under an excess of pressure from the safety lifeline, is extendible in length, leanable and tiltable, affords a 360° range of motion, and wherein the at least partially corrugated enclosed bellows forming chamber is deformable from a contracted state to a plurality of expanded states thereby dispersing fall energy from the load.

* * * * *